US007139411B2

(12) United States Patent
Fujimura et al.

(10) Patent No.: US 7,139,411 B2
(45) Date of Patent: Nov. 21, 2006

(54) PEDESTRIAN DETECTION AND TRACKING WITH NIGHT VISION

(75) Inventors: Kikuo Fujimura, Palo Alto, CA (US); Fengliang Xu, Columbus, OH (US)

(73) Assignees: Honda Giken Kogyo Kabushiki Kaisha, Tokyo (JP); The Ohio State University Research Foundation, Columbus, OH (US)

( * ) Notice: Subject to any disclaimer, the term of this patent is extended or adjusted under 35 U.S.C. 154(b) by 461 days.

(21) Appl. No.: 10/462,078

(22) Filed: Jun. 13, 2003

(65) Prior Publication Data

US 2006/0177097 A1  Aug. 10, 2006

Related U.S. Application Data

(60) Provisional application No. 60/388,727, filed on Jun. 14, 2002.

(51) Int. Cl.
*G06K 9/00* (2006.01)
(52) U.S. Cl. .................. 382/103; 250/330; 250/342; 348/149; 348/164; 348/169; 382/103; 382/159; 382/224
(58) Field of Classification Search .............. 250/330, 250/334; 345/7; 348/149; 359/630; 382/115, 382/118, 141, 157, 224, 225, 226, 103
See application file for complete search history.

(56) References Cited

U.S. PATENT DOCUMENTS

| | | | | |
|---|---|---|---|---|
| 4,967,276 A | * | 10/1990 | Murakami et al. | 348/164 |
| 5,414,439 A | * | 5/1995 | Groves et al. | 345/7 |
| 5,729,016 A | * | 3/1998 | Klapper et al. | 250/334 |
| 5,742,055 A | * | 4/1998 | Lee | 250/353 |
| 5,850,470 A | * | 12/1998 | Kung et al. | 382/157 |
| 5,987,154 A | * | 11/1999 | Gibbon et al. | 382/115 |
| 6,104,835 A | * | 8/2000 | Han | 382/225 |
| 6,181,805 B1 | * | 1/2001 | Koike et al. | 382/118 |
| 6,327,522 B1 | | 12/2001 | Kojima et al. | |
| 6,384,414 B1 | * | 5/2002 | Fisher et al. | 250/339.14 |
| 6,411,328 B1 | * | 6/2002 | Franke et al. | 348/149 |
| 6,420,704 B1 | * | 7/2002 | Berenz et al. | 250/330 |
| 6,421,463 B1 | * | 7/2002 | Poggio et al. | 382/224 |
| 6,445,832 B1 | * | 9/2002 | Lee et al. | 382/266 |

(Continued)

OTHER PUBLICATIONS

A. Baumberg and D. Hogg, "Learning Flexible Models From Image Sequences," *European Conference on Computer Vision*, vol. 1, 1994, pp. 299-308.

(Continued)

*Primary Examiner*—Matthew C. Bella
*Assistant Examiner*—Gregory Desire
(74) *Attorney, Agent, or Firm*—Fenwick & West LLP; Mark E. Duell

(57) ABSTRACT

A system and method for detecting and tracking humans, such as pedestrians, in low visibility conditions or otherwise. A night vision camera periodically captures a an infrared image of a road from a single perspective. A pedestrian detection module determines a position of a pedestrian in the frame by processing the captured image. The pedestrian detection module includes a support vector machine to compare information derived from the night vision camera to a training database. A pedestrian tracking module estimates pedestrian movement of the detected pedestrian from in subsequent frames by applying filters. The tracking module uses Kalman filtering to estimate pedestrian movement at periodic times and mean-shifting to adjust the estimation. An output display module interleaves detection frames and tracking frames in generating output video for the display.

42 Claims, 14 Drawing Sheets

U.S. PATENT DOCUMENTS

| | | | | |
|---|---|---|---|---|
| 6,580,373 | B1* | 6/2003 | Ohashi | 340/901 |
| 6,597,800 | B1* | 7/2003 | Murray et al. | 382/103 |
| 6,690,011 | B1* | 2/2004 | Watanabe et al. | 250/330 |
| 6,718,049 | B1* | 4/2004 | Pavlidis et al. | 382/115 |
| 6,731,436 | B1* | 5/2004 | Ishii et al. | 359/630 |
| 6,751,342 | B1* | 6/2004 | Shepard | 382/141 |
| 6,775,411 | B1* | 8/2004 | Sloan et al. | 382/224 |
| 6,803,574 | B1* | 10/2004 | Abel et al. | 250/330 |
| 6,808,200 | B1* | 10/2004 | Drobny et al. | 280/735 |
| 6,815,680 | B1* | 11/2004 | Kormos | 250/330 |
| 6,823,241 | B1* | 11/2004 | Shirato et al. | 701/1 |
| 6,828,544 | B1* | 12/2004 | Stephan et al. | 250/214 VT |
| 2003/0053664 | A1 | 3/2003 | Pavlidis et al. | |

OTHER PUBLICATIONS

A. Broggi et al., "Shape-Based Pedestrian Detection," *Proceedings of the IEEE Intelligent Vehicles, Symposium*, Dearborn (MI), USA, Oct. 2000, pp. 215-220.

Q. Cai and J. K. Aggarwal, "Tracking Human Motion in Structured Environments Using a Distributed-Camera System," *IEEE Transactions on Pattern Analysis and Machine Intelligence*, 21(12), Nov. 1999, pp. 1241-1247.

Y. Cheng, "Mean Shift, Mode Seeking, and Clustering," *IEEE Transactions on Pattern Analysis and Machine Intelligence*, 17(8), 1995, pp. 790-799.

D. Comaniciu et al., "Real-Time Tracking of Non-Rigid Objects Using Mean Shift," *Proc. IEEE Conf. On Computer Vision and Pattern Recognition*, vol. 2, Jun. 13-15, 2000, pp. 142-149.

R. Cutler and L. Davis, "Robust Real-Time Periodic Motion Detection, Analysis, and Applications," *IEEE Transaction on Pattern Analysis and Machine Intelligence*, 22(8), Aug. 2000, pp. 781-796.

T. Darrell et al., "Integrated Person Tracking Using Stereo, Color, and Pattern Detection," *IEEE Conference on Computer Vision and Pattern Recognition*, 1998, pp. 1-8.

J. Deutscher et al., "Articulated Body Motion Capture by Annealed Particle Filtering," *Proc. IEEE Conf. On Computer Vision and Pattern Recognition*, vol. 2, 2000, pp. 126-133.

U. Franke et al., "Autonomous Driving Goes Downtown," *IEEE Intelligent Systems*, Nov./Dec. 1998, pp. 32-40.

D.M. Gavrila and V. Philomin, "Real-Time Object Detection for 'Smart' Vehicles," *Proc. of IEEE International Conference on Computer Vision*, 1999, 6 pages.

I. Haritaoglu et al., "Backpack: Detection of People Carrying Objects Using Silhouettes," *International Conference on Computer Vision*, Sep. 1999, 6 pages.

I. Haritaoglu et al., "W4: Real-Time Surveillance of People and Their Activities," *IEEE Transactions on Pattern Analysis and Machine Intelligence*, 22(8), Dec. 2000, pp. 809-830.

Haykin, Simon, "Adaptive Filter Theory," Third Edition, Prentice Hall, Inc., New Jersey, 1996, pp. 302-334.

B. Heisele et al., "Face Recognition With Support Vector Machines: Global Versus Component-Based Approach," *IEEE International Conference on Computer Vision*, 2001, pp. 688-694.

I. Kakadiaris and D. Metaxas, "Model-Based Estimation of 3D Human Motion," *IEEE Transactions on Pattern Analysis and Machine Intelligence*, 22(12), Dec. 2000, pp. 1453-1459.

A. Mohan and T. Poggio, "Example-Based Object Detection in Images by Components," *IEEE Transactions on Pattern Analysis and Machine Intelligence*, 23(4), Apr. 2001, pp. 349-361.

C. Papageorgiou et al., "A Trainable Pedestrian Detection System," *Proc. Of Intelligent Vehicles*, Oct. 1998, pp. 241-246.

M. Oren et al., "Pedestrian Detection Using Wavelet Templates," *IEEE Proc. On Computer Vision and Pattern Recognition*, 1997, pp. 193-199.

E. Osuna et al., "Training Support Vector Machines: an Application to Face Detection," *Computer Vision and Pattern Recognition*, 1997, pp. 130-136.

R. Polana and R. Nelson, "Low Level Recognition of Human Motion," *Workshop on Motion of Non-Rigid and Articulated Objects*, Oct. 1994, pp. 77-82.

Y. Ricquebourg and P. Bouthemy, "Real-Time Tracking of Moving Persons by Exploiting Spatio-Temporal Images Slices," *IEEE Transaction on Pattern Analysis and Machine Intelligence*, 22(8), Aug. 2000, pp. 797-808.

K. Rohr, "Incremental Recognition of Pedestrians From Image Sequences," *Proc. Computer Vision and Pattern Recognition*, 1993, pp. 8-13.

S. Romdhani et al., "Computationally Efficient Face Detection," *IEEE International Conference on Computer Vision*, 2001. pp. 1-7.

H. Sawhney et al., "Independent Motion Detection 3D Scenes," *IEEE Transaction on Pattern Analysis and Machine Intelligence*, 22(10), Oct. 2000, pp. 1191-1199.

Y. Song et al., "Towards Detection of Human Motion," *IEEE Conf. On Computer Vision and Pattern Recognition*, 2000, pp. 810-817.

V. Vapnik, "Statistical Learning Theory," *Springer*, 2000, pp. 24-25.

G. Welch and G. Bishop, "An Introduction to the Kalman Filter," University of North Carolina at Chapel Hill, Department of Computer Science, Chapel Hill, NC, TR95-041.

L. Zhao and C. Thorpe, "Stereo and Neural Network-Based Pedestrian Detection," *Proc. Int'l Conf. On Intelligent Transportation Systems*, Oct. 1999, 6 pages.

Liu, Xia, et al., "Pedestrian Detection Using Stereo Night Vision," *IEEE Transactions on Vehicular Technology*, vol. 53-6, Nov. 2004, pp. 1657-1665.

Xu, Fengliang, et al., "Pedestrian Detection and Tracking with Night Vision," *IEEE Transactions on Intelligent Transportation Systems*, vol. 5, No. 4, 2004, pp. 1-10.

\* cited by examiner

NIGHT VISION DISPLAY MODULE
155

Pedestrian Detection Module
220

Pedestrian Tracking Module
230

Display Output Module
240

FIG. 2

PEDESTRIAN DETECTION AND TRACKING WITH NIGHT VISION

CROSS REFERENCE TO RELATED APPLICATIONS

This application is related to U.S. Provisional Patent Application No. 60/388,727, filed on Jun. 14, 2002, entitled "Pedestrian Detection and Tracking with Night Vision," from which priority is claimed under 35 U.S.C. § 119(e) and which application is incorporated by reference herein in its entirety. This application is also related to U.S. patent application Ser. No. 10/396,285, entitled "Real-Time Eye Detection and Tracking Under Various Light Conditions," which is also incorporated by reference herein in its entirety.

BACKGROUND OF THE INVENTION

1. Field of the Invention

This invention relates generally to object recognition by computers, and more specifically, to pedestrian tracking and detection.

2. Background Art

Computer vision through object recognition is a giant step in computer intelligence that provides a myriad of new capabilities. Recognition of humans has particularly valuable applications in vehicle safety, robot interaction, security surveillance and military operations. In one example, a pedestrian recognition system in a moving vehicle can provide early warnings of a pedestrian crossing the street or even riding a bicycle.

Unfortunately, current pedestrian recognition systems are too cost prohibitive for most widespread applications. The typical system requires two cameras to determine a pedestrian's distance from the vehicle. Additionally, significant processing power is needed to handle frame-by-frame computationally intensive operations in distinguishing pedestrians from background in a video.

Another problem with typical recognition systems is that they require the camera to be stationary. Moving objects can thus be distinguished from non-moving objects as a first cut in human recognition. However, a moving camera, e.g., on a vehicle or robot, a rotatable security camera or a camera in goggles worn by a soldier, do not provide stationary backgrounds.

Still another problem with typical recognition systems is that their pattern matching is based on color gradients, which may be limited in certain conditions such as low lighting.

Therefore, what is needed is a robust method and system of pedestrian detection and tracking for low visibility conditions with a non-stationary background that can be implemented using a single camera and manageable computer processing requirements.

SUMMARY OF THE INVENTION

The present invention meets these needs by providing human detection and tracking with night vision. A system includes a computing environment with a night vision display module coupled to a night vision camera and a display. The night vision camera may be an infrared video source that periodically captures an infrared image of a road under any lighting conditions, e.g., low lighting from a single perspective. A pedestrian detection module determines a position of a pedestrian in the frame by processing the captured image. A pedestrian tracking module estimates pedestrian movement of the detected pedestrian in subsequent frames by applying filters. An output display module interleaves detection frames and tracking frames in generating output video for the display. In other embodiments, the system includes an audio warning module for generating a warning sound in response to a pedestrian's proximity to the vehicle.

In one embodiment, the pedestrian detection module includes a candidate detection module to identify pedestrian candidates from hotspots, or areas in the captured image with high intensity that have not been noise suppressed. The candidate detection module determines whether a hotspot is a body-center type candidate, and if not, whether the hotspot is part of a group of hotspots that form a body-ground type candidate. The candidate detection module uses grayscale image clips derived from hotspot positions with respect to the road. A road detection module finds some of the road edges.

In another embodiment, the pedestrian detection module includes a candidate detection module and a verification module. The candidate detection module uses a road detection module to detect candidates based on a detected road. The road detection module may use Sobel edge operations in combination with an erosion/dilation morphological operation to detect the road. The candidate verification module may use a support vector machine to classify image clips before executing pattern recognition against a training database. The training database stores image clips organized by classifiers. The image clips may be, for example, humans, mammals, or objects. Classifiers may be, for example in the case of humans, a pedestrian front profile, side profile, or bicyclist.

In still another embodiment, the pedestrian tracking module includes a pedestrian movement module that applies Kalman filtering to detected pedestrians in predicting their movement between frames. A prediction adjustment module may apply mean-shifting to the Kalman filtering position to generate a more precise estimation.

BRIEF DESCRIPTION OF THE FIGURES

FIG. 2 is a block diagram illustrating the night vision display module according to one embodiment of the present invention.

DETAILED DESCRIPTIONS OF THE PREFERRED EMBODIMENTS

Figure 1:
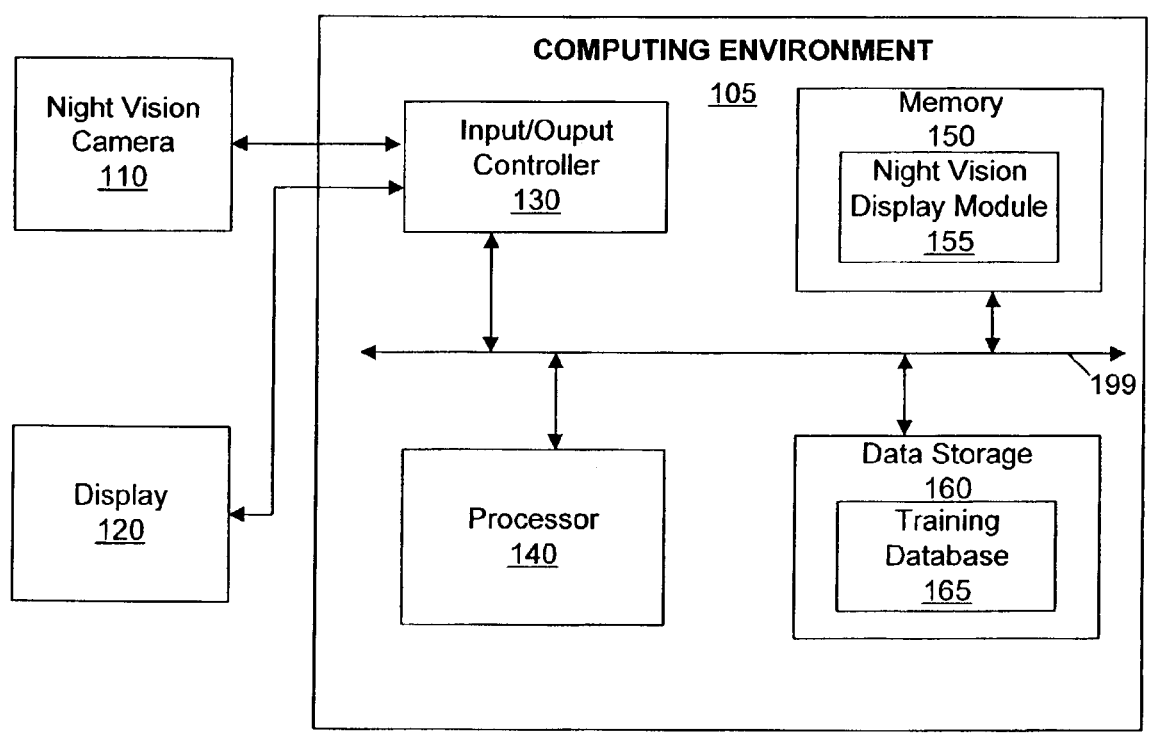
FIG. 1 is a block diagram illustrating a system for pedestrian detection and tracking with night vision according to one embodiment of the present invention.

FIG. 1 is a block diagram illustrating a system for pedestrian detection and tracking with night vision according to one embodiment of the present invention. The system 100 comprises a computing environment 105 coupled to a night vision camera 110 and a display 120.

The night vision camera 110 generates video in low visibility and other conditions from a single perspective. The night vision camera 110 can be, for example, an infrared camera using thermal imaging to provide a sequence of captured images showing heat gradients, an image enhancement camera, or other low visibility video source. Exposed human body parts from pedestrians show up on the captured images in the upper part of the heat gradients. Additionally, other objects such as animals, lights, and other heat emitting non-human objects also show up on in the upper heat gradients. Note that although the night vision camera 110 does not rely upon light intensity to capture an image, that it is also effective during normal visibility, such as daytime.

The display 120 receives and displays processed video from the computing environment 105. The display 120 may be a monitor, such as an LCD or plasma type, a television, or other type of display device.

The computing environment 105 further comprises an input/output controller 130, a processor 140, a memory 150, and data storage 160, each of which is coupled to a bus 199. The computing environment 105 may be a separate device such as a computer, or a system of components integrated into a host environment such as a vehicle. Note that while the computing environment 105 and its components may be optimized for pedestrian detection and tracking, it may also be used for other computing tasks.

The input/output controller 130 receives video data from the night vision camera 110 for processing and sends processed video data to the display 120. The input/output controller 130 may further comprise an audio/video interface, interface drivers, a set of input buffers and a set of output buffers and/or microcode for interrupts. The input/output controller 130 may be implemented in hardware, software, or a combination.

The processor 140 executes instructions and manipulates data necessary for video processing in the system 100. The processor 140 may be a microprocessor such as a Pentium 4® by Intel Corp. or an Athlon XP® by Advanced Micro Devices, an ASIC, a FPD (field programmable device), a microcontroller, or any other device capable of executing instructions and manipulating data.

The memory 150 provides volatile storage of software and data necessary for video processing in the system 100. In one embodiment, the memory 150 also includes a night vision display module 155 to control and perform video processing in the system 100. In another embodiment, the memory 150 may include an audio output module to generate warning sounds. In still another embodiment, the memory 150 may include a response module to automatically take an action in response to pedestrians being within close range. The memory 150 may be, for example, a random access memory, a buffer, a cache, a register, or other device capable of storing instructions and data. The memory 150 may be a single dedicated device or a system of dynamically allocated devices.

The data storage 160 provides non-volatile storage of data necessary for video processing in the system 100. The data storage 160 may be, for example, a hard disk, a compact flash device, an EEPROM, or other device capable of data storage. The data storage 160 may also be a single storage device or a system of storage devices.

In one embodiment, the data storage 160 also includes a training database 165 providing preloaded pedestrian images for comparison to the video during pedestrian detection. The pedestrian images may be a variety of image clips having pedestrians of different positions and sizes. The image clips may be in a format such as GIF (Graphics Interchange Format), BMP (Bitmap File), JPEG (Joint Photographic Experts Group), TIFF (Tagged Image File Format), or the like. The image clips may be positive image clips for positive identifications of objects as humans and negative image clips for positive identification of objects as non-humans.

In another embodiment, the system 100 may further comprise an audio alert system to generate an audio alert in response to a pedestrian's proximity. In yet another embodiment, the system 100 may further comprise an animal training database or other training database to detect animals or other objects in the road. In still another embodiment, the system 100 may further comprise a robot system that performs a set of actions, such as navigation or other movement, in response to receiving data related to human detection and tracking.

FIG. 2 is a block diagram illustrating the night vision display module 155 according to one embodiment of the present invention. The night vision display module 155 comprises a pedestrian, or human, detection module 220, a pedestrian, or human, tracking module 230, and an output display module 240.

Generally, the pedestrian detection module 220 generates the detection frame using night vision information in the current image frame as discussed in further detail below with respect to FIG. 6. The pedestrian tracking module 230 generates the tracking frame by estimating pedestrian movement for future frames following the detection frame. The output display module 240 generates output video to the display 120 by interleaving detection frames with tracking frames. Components of the night vision display module 155 and methods operating therein are discussed in further detail below with respect to FIG. 5.

Figure 3:
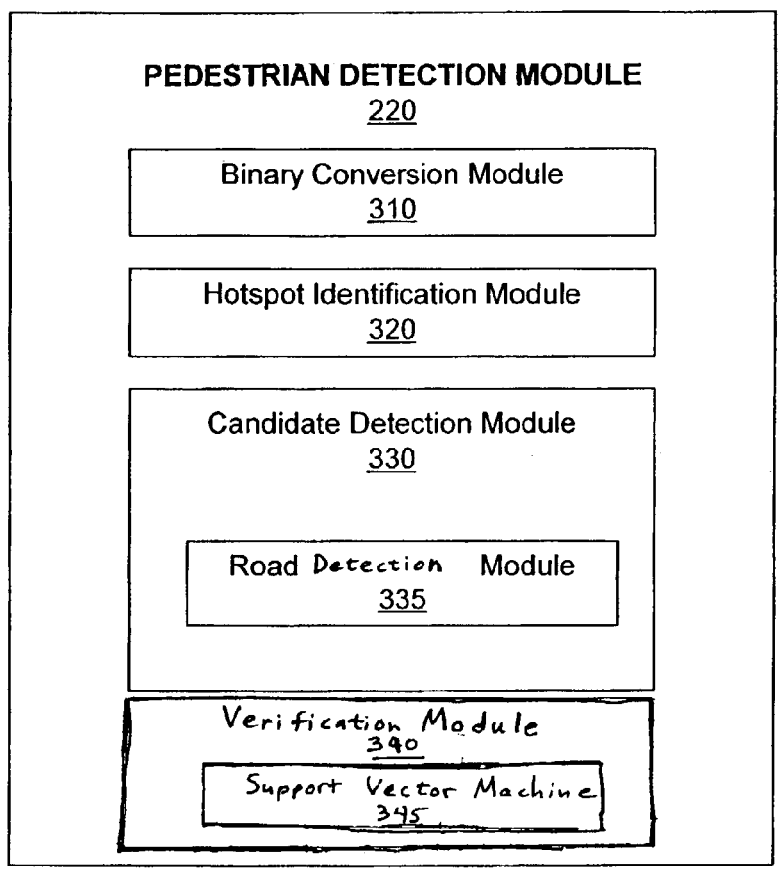
FIG. 3 is a block diagram illustrating the pedestrian detection module according to one embodiment of the present invention.

FIG. 3 is a block diagram illustrating the pedestrian detection module 220 according to one embodiment of the present invention. The pedestrian detection 220 module comprises a binary conversion module 310, a hotspot identification module 320, a candidate detection module 330, and a verification module 340.

Figure 7:
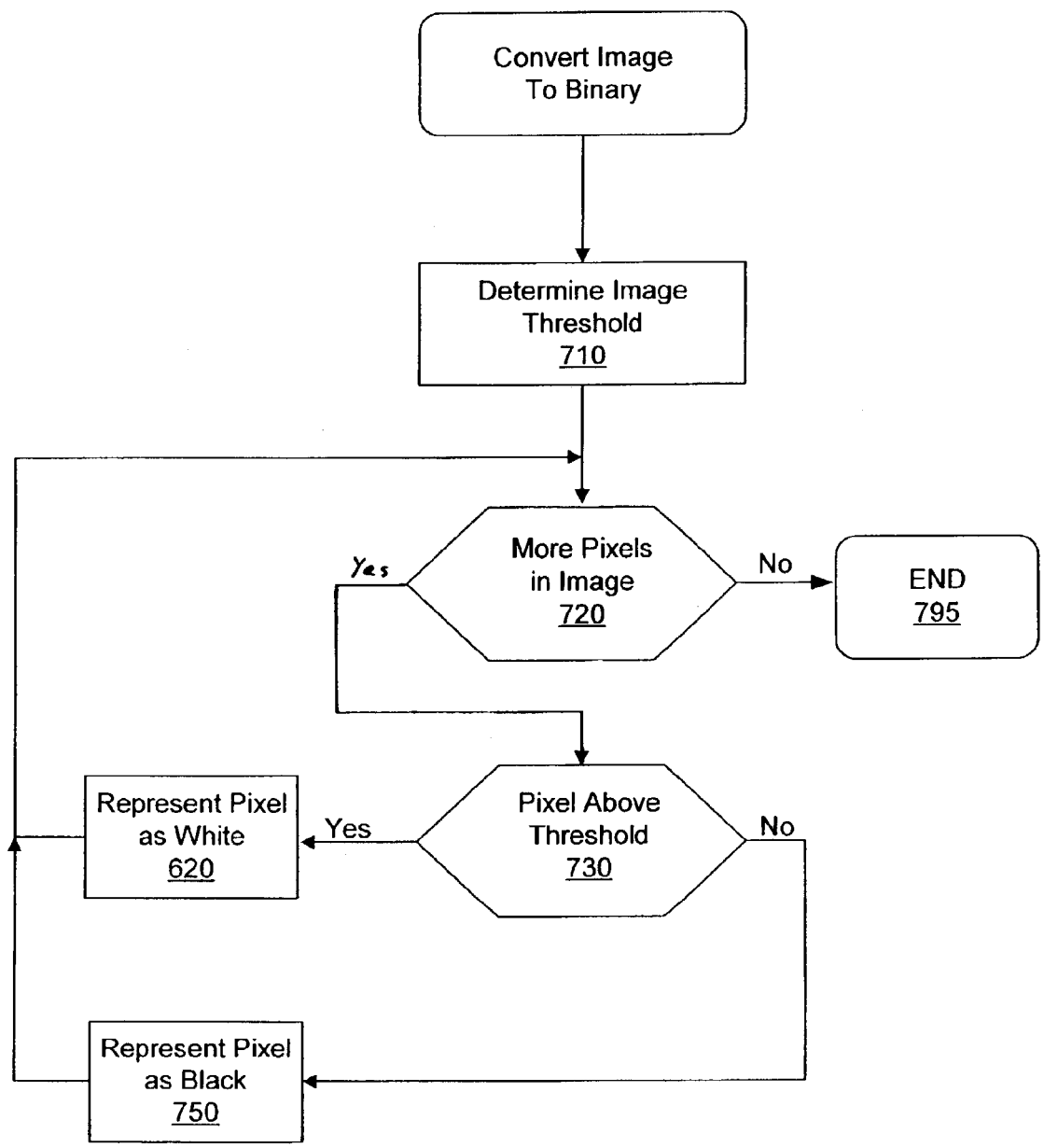
FIG. 7 is a flow chart illustrating a method of generating a binary representation from the captured image according to one embodiment of the present invention.

In general, the binary conversion module 310 converts the captured image to a binary representation of pixels above and below a threshold intensity as discussed in further detail below with respect to FIG. 7. The hotspot identification module 320 preprocesses the current image to eliminate black pixel clusters that are not likely to be human (or other target mammal) as discussed in further detail below with respect to FIG. 8. The candidate detection module 330 determines whether a pixel cluster or group of pixel clusters are proper human candidates and prepares corresponding image portions for verification. The candidate detection module 330 may include a road detection module 335 to detect some road edges by using the road's characteristic of having constant intensity. The candidate detection module 330 is discussed in further detail below with respect to FIG. 9. The verification module 340 compares candidates with training data to determine if the candidate is actually a pedestrian as discussed in further detail below with respect to FIG. 10.

Figure 4:
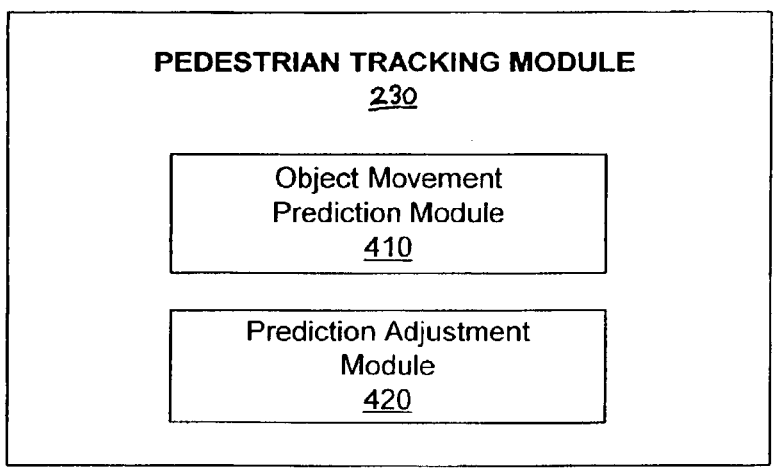
FIG. 4 is a block diagram illustrating the pedestrian tracking module according to one embodiment of the present invention.

FIG. 4 is a block diagram illustrating the pedestrian tracking module 230 according to one embodiment of the present invention. The pedestrian tracking module 230 includes an object movement prediction module 410 and a prediction adjustment module 420.

Figure 11:
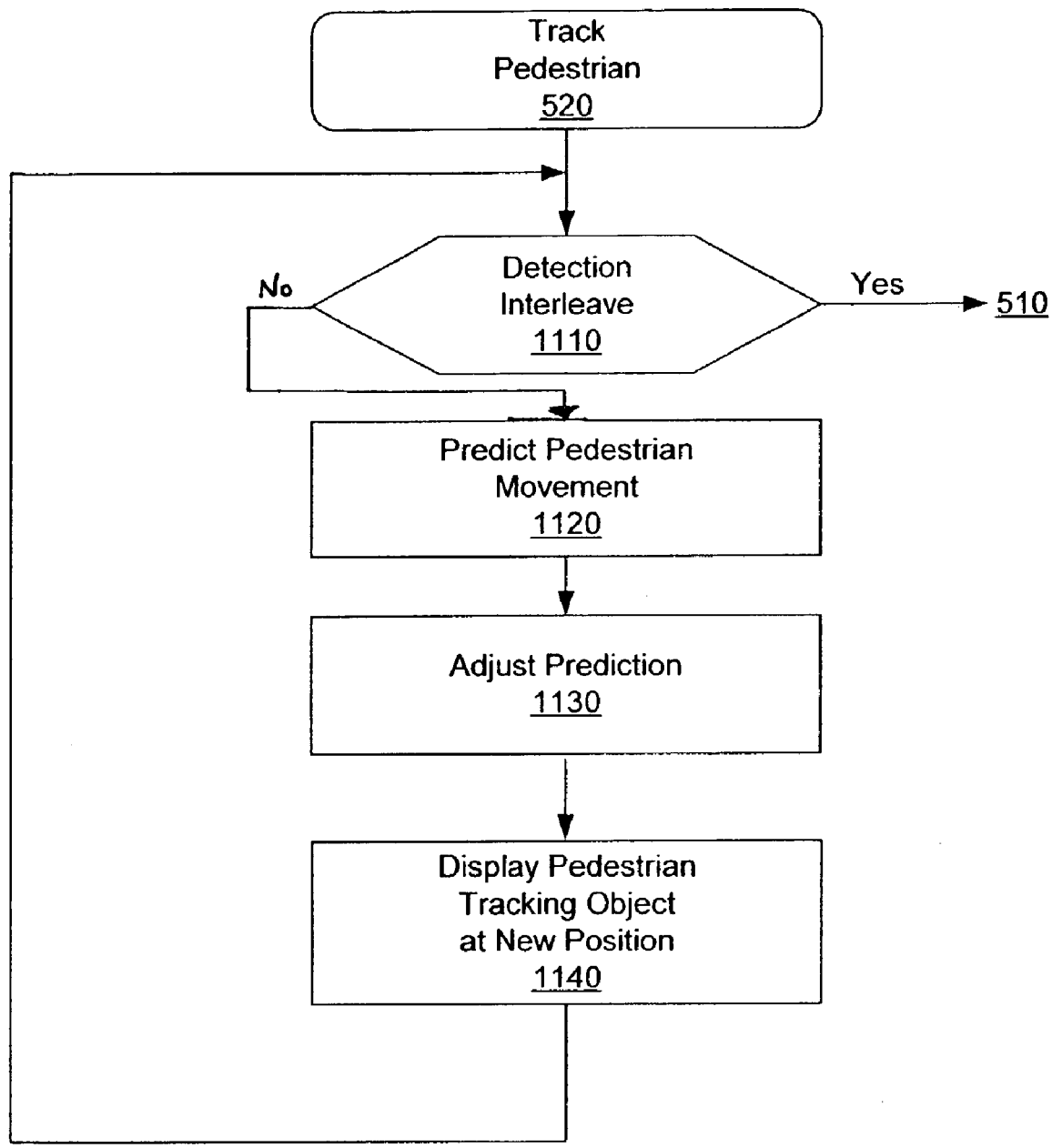
FIG. 11 is a flow chart illustrating the method of tracking pedestrians according to one embodiment of the present invention.

Generally, the object movement prediction module 410 applies a filter to the current pedestrian position to estimate a new position as discussed in detail below with respect to FIG. 11. The prediction adjustment module 420 applies an additional filter to the estimated position in accounting for nonlinear pedestrian movement as discussed in detail below with respect to FIG. 11.

Figure 5:
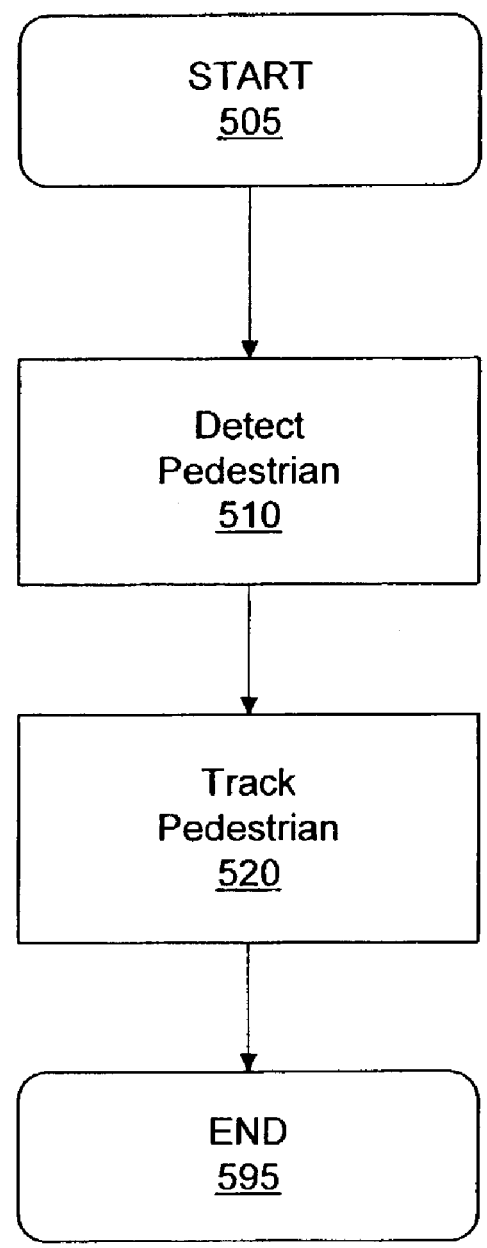
FIG. 5 is a flow chart illustrating a method of pedestrian detection and tracking according to one embodiment of the present invention.

FIG. 5 is a flow chart illustrating a method of pedestrian detection and tracking according to one embodiment of the present invention. The pedestrian detection module 220 detects 510 pedestrians by processing video from the night vision camera 110. Also, the pedestrian tracking module 230 tracks 520 pedestrians by processing detection frames and/or previous tracking frames along with current frames.

Figure 6:
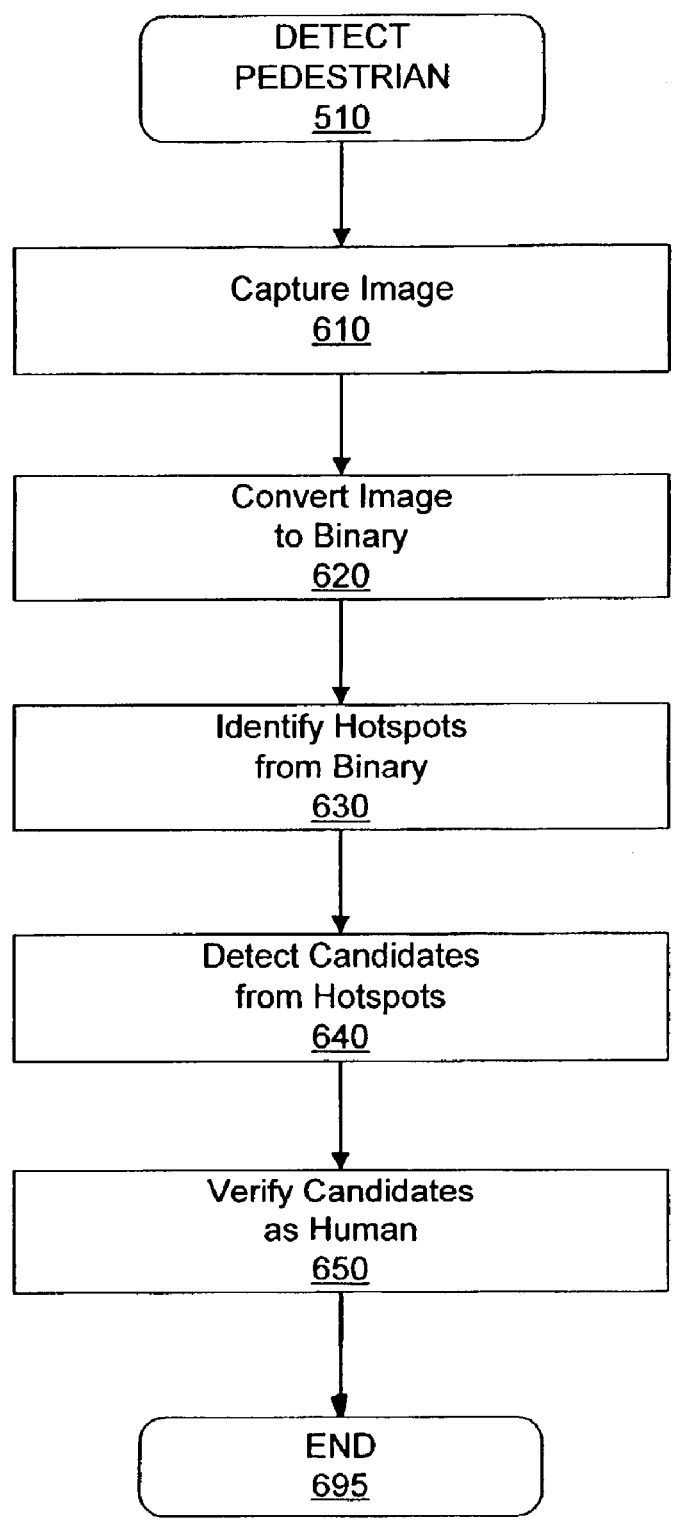
FIG. 6 is a flow chart illustrating the method of detecting pedestrians according to one embodiment of the present invention.
Figure 12A:
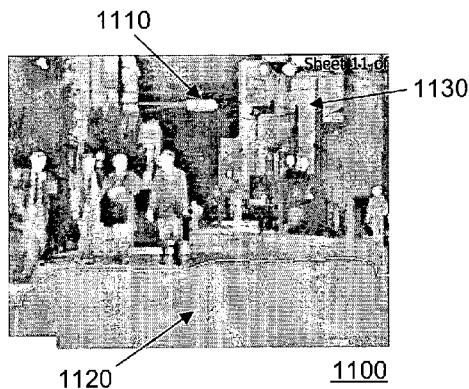
FIG. 12a is an example of a captured image according to one embodiment of the present invention.

FIG. 6 is a flow chart illustrating the method of detecting 510 pedestrians with the pedestrian detection module 220 according to one embodiment of the present invention. The night vision camera 120 captures 610 images containing the road, pedestrians, and other objects and sends to the images to the computing environment 105. The input/output controller 130 receives captured images, e.g., grayscale images, and sends them to the memory 150. FIG. 12a is an example of the captured image according to one embodiment of the present invention. The captured image 1100 includes areas of high intensity, e.g. 1110, areas of constant intensity, e.g. 1120, and areas of neither high nor constant intensity, e.g. 1130.

Referring to FIG. 6, the binary conversion module 310 converts 620 the captured image to a binary representation. FIG. 7 is a flow chart illustrating a method of generating 620 a binary representation from the captured image according to one embodiment of the present invention. The binary conversion module 310 determines 710 an image threshold. The binary conversion module 310 performs 720 an iterative process until all pixels needed for the binary image have been processed. In the processing, the binary conversion module 310 represents 740 pixels above the intensity threshold as black and represents 750 pixels below the intensity threshold as white pixels, although other representations may be used, e.g., "0" and "1."

In one embodiment, the binary conversion module 310 calculates the threshold intensity as a balance between the mean image intensity and the highest intensity as shown in equation (1). The highest intensity may be the absolute highest intensity or a range of highest intensity. The threshold intensity is adaptive to the brightness of a particular image. The binary conversion module 310 represents pixels above the threshold intensity as black pixels and pixels below the threshold intensity as white pixels. In other embodiments, different balances may be used. The binary conversion module 310 initiates the hotspot identification module and/or sends an indication of black pixels such as their locations in the current image.

$$\text{threshold intensity} = 0.2 \text{ (mean image intensity)} + 0.8 \text{ (highest intensity)} \quad (1)$$

Figure 12B:
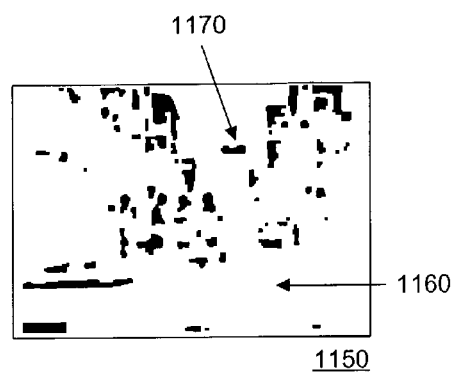
FIG. 12b is an example of a binary image according to one embodiment of the present invention.

FIG. 12b is an example of the binary image according to one embodiment of the present invention. The binary image 1150 includes black pixels 1170 representing pixels above the intensity threshold and white pixels 1160 representing pixels below the intensity threshold.

Figure 8:
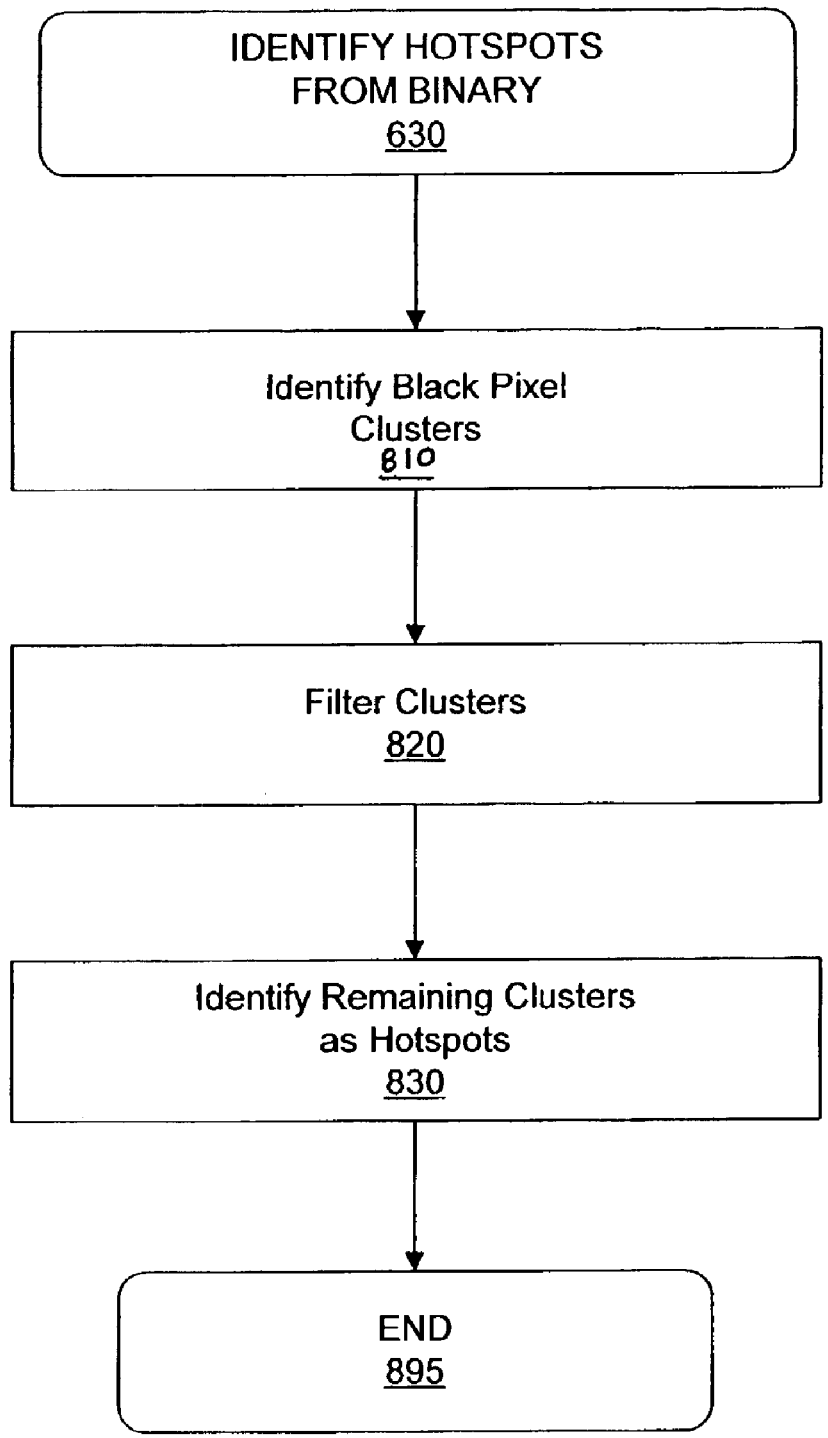
FIG. 8 is a flow chart illustrating the method of identifying hotspots from the white pixel clusters according to one embodiment of the present invention.

Referring again to FIG. 6, the hotspot identification module 320 identifies 630 hotspots from the binary representation. FIG. 8 is a flow chart illustrating a method of identifying 630 pixel clusters from the binary image according to one embodiment of the present invention. The hotspot identification module 320 identifies 810 black pixel clusters. Black pixel clusters are groups of adjacent pixels above the threshold intensity. The hotspot identification module 320 filters 820 clusters. In one embodiment, the hotspot identification module 320 executes a morphological operation to eliminate pixel clusters using size and/or shape parameters. Accordingly, pixel clusters that are smaller than or outside of a height/width ratio of likely humans or human body parts are eliminated. In another embodiment, a noise suppressor that identifies non-human objects or otherwise eliminates objects outside of human parameters may eliminate black pixel clusters. The hotspot identification module 320 identifies 830 the remaining clusters as hotspots.

Figure 17:
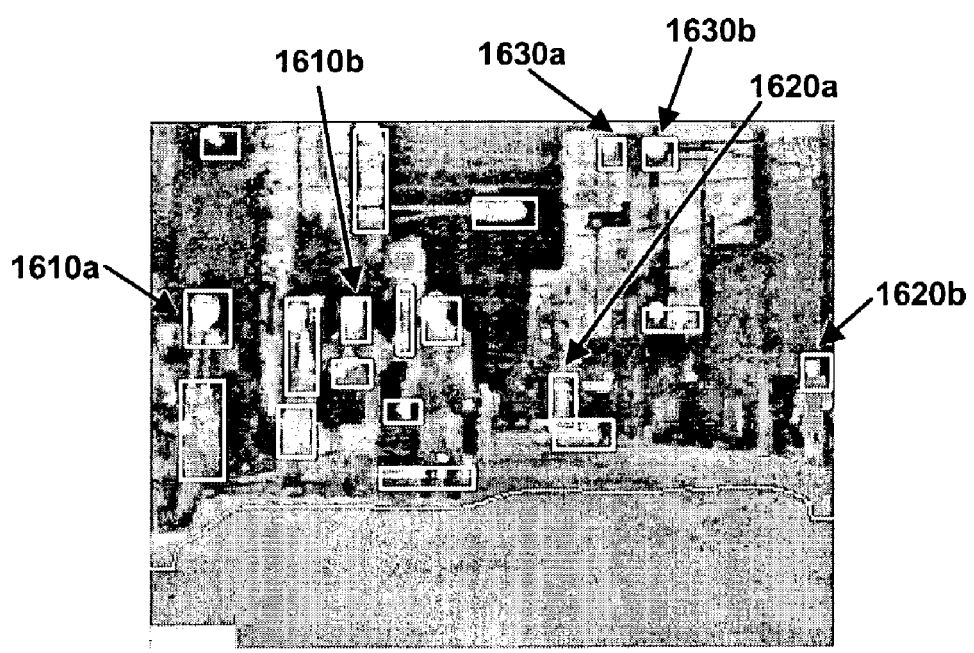
FIG. 17 is an example of a hotspot image according to one embodiment of the present invention.

FIG. 17 is an example of a hotspot image according to one embodiment of the present invention. The hotspot image 1600 includes hotspots that are actual humans 1610, 1620 and hotspots that are non-human 1630. For the purposes of illustration, all of the hotspots 1610–1630, etc. are identified by square hotspot objects. Note, however, that the present invention does not necessarily display the square hotspot objects.

Figure 9:
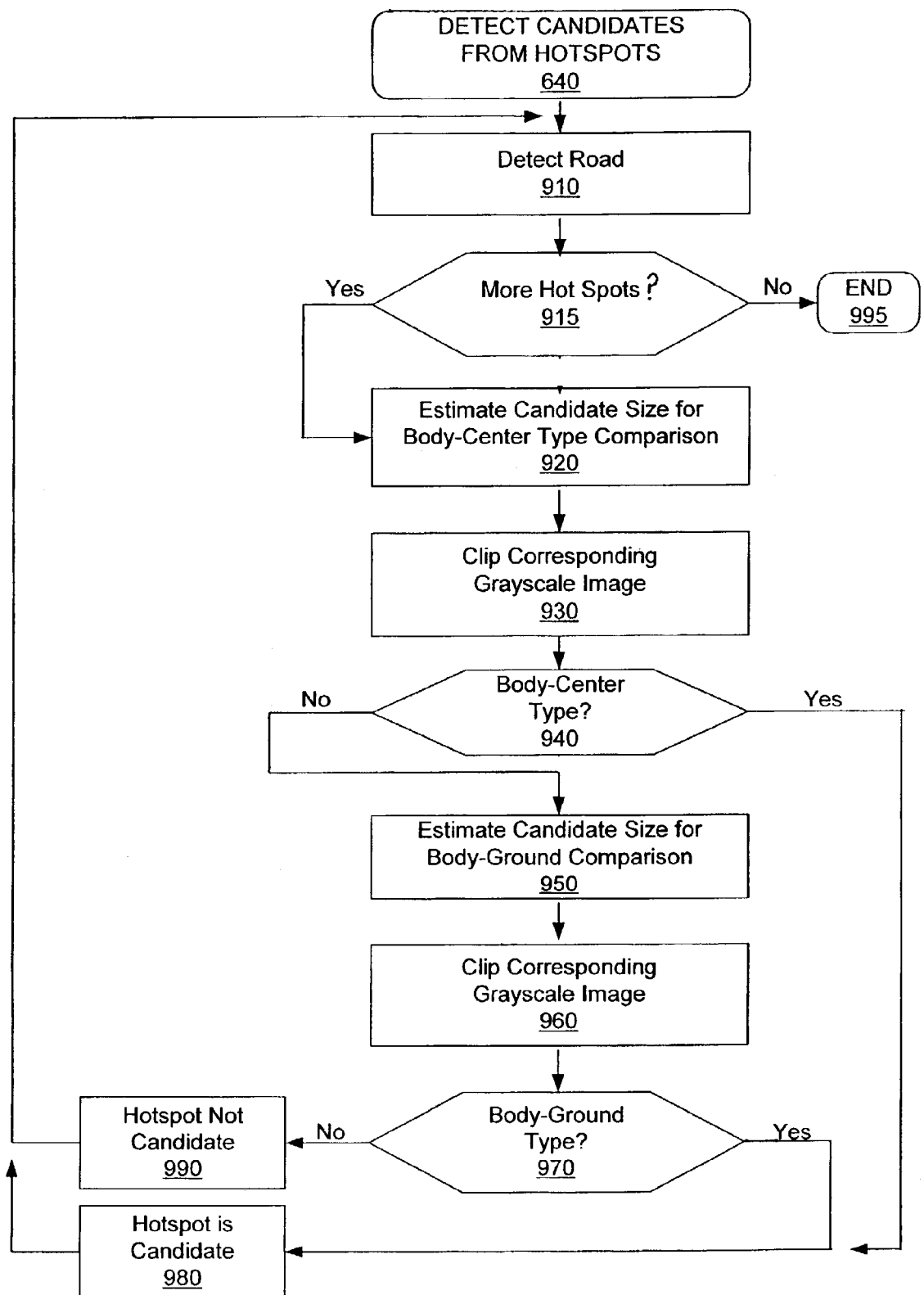
FIG. 9 is a flow chart illustrating the method of detecting candidates from the hotspots according to one embodiment of the present invention.

In FIG. 6, the candidate detection module 330 identifies 640 candidates from the hotspots. FIG. 9 is a flow chart illustrating a method of identifying 640 hotspots from the black pixel clusters according to one embodiment of the present invention. The candidate detection module 330 estimates 910 the candidate size for body-center comparison. The candidate detection module 330 clips or extracts 920 the grayscale image corresponding to the size estimate.

The candidate detection module 330 determines 930 whether the clip is a body-center type. If so, then the hotspot is a candidate 970. A body-center candidate is a single pixel cluster representing, for example, a human head or human body profile, that meets certain criteria indicative of human features. One criteria may be the estimated size of the potential candidate as measured from the top of the pixel cluster to the road. Another criteria may be a height/width ratio of the potential candidate such as 3/1.

If the hotspot is not a body-center candidate, the candidate detection module 330 estimates 940 the candidate size for body-ground type comparison. Body-ground candidates are a group of pixel clusters representing a combination of, for example, a human head, human hands, human feet, or other detected body parts. Similar criteria may be used for potential candidates, albeit with respect to the group. The candidate detection module 330 clips 950 the corresponding grayscale image. The candidate detection module 330 determines 960 whether the clip is a body-ground type. If so, then the hotspot is a candidate 970 for verification. Otherwise, the hotspot is eliminated from future processing.

Figure 13A:
FIGS. 13a–d are images illustrating candidate detection according to one embodiment of the present invention.
Figure 13B:
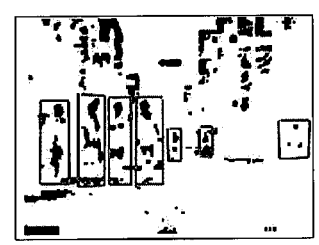
Figure 13C:
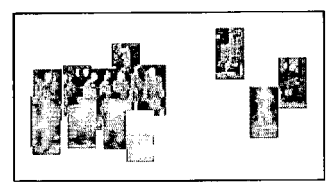
Figure 13D:
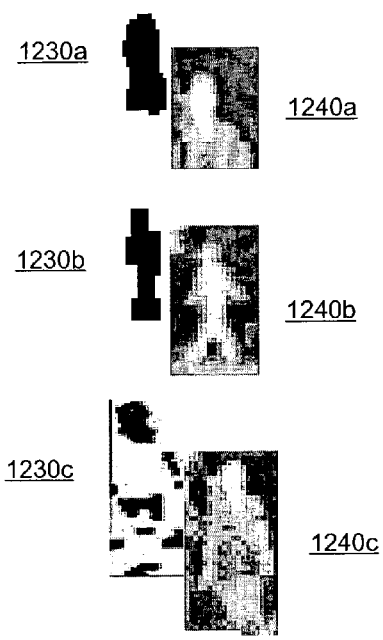
Figure 13D:
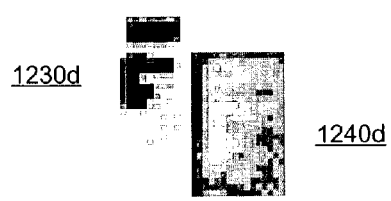

FIGS. 13a–d are images illustrating candidate detection according to one embodiment of the present invention. FIG. 13a is an example image of the road detection image, which is discussed further below with respect to FIGS. 14a–e. FIG. 13b is an image of candidates detected from the hotspot image. In contrast to the binary image 1150 of FIG. 12b, many black pixel clusters have been eliminated by the noise suppression, and many hotspots have been eliminated by failing the body-center type and the body-ground type tests. FIG. 13c is an image of candidates as a grayscale image clip. FIG. 13d is an image comparing binary candidates 1230 with corresponding grayscale candidates 1240. The grayscale candidates 1240 are used in verification.

In one embodiment, the candidate detection module 330 estimates the candidate size from a distance between the top of a hotspot and the road image. The road detection module 335 detects some road edges by using the road's characteristic of having constant intensity. The road detection module 335 executes erosion and dilation morphological operations with an appropriate kernel for the conditions. For example, whereas the kernel may be a rectangle for flat, close road portions, the kernel may be more square-like for hilly, far away road portions.

In one embodiment, the road detection module 335 uses a Sobel edge detector to perform a two-dimensional gradient measurement on the captured image. In doing so, the Sobel edge detector employs a convolution kernel to identify areas of high spatial frequency. The kernel is designed to emphasize horizontal and vertical edges. Note that the road detection module 335 may use other edge detection techniques, such as a Robert Cross operator or a Prewitt gradient edge detector.

Figure 14A:
FIGS. 14a–e are images illustrating road detection according to one embodiment of the present invention
Figure 14B:
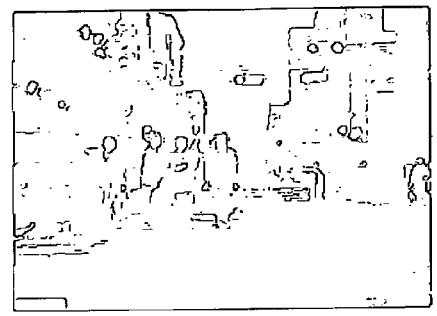
Figure 14C:
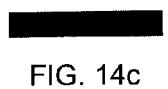
Figure 14D:
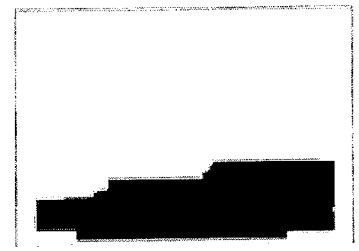
Figure 14E:
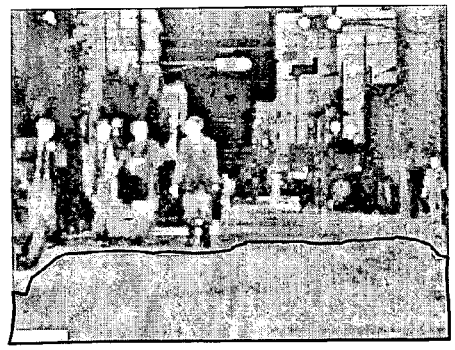

FIGS. 14a–e are images illustrating road detection according to one embodiment of the present invention. FIG. 14a is an example of the captured image that is used for road detection. FIG. 14b is an example of the edge image outlining constant gradients in the captured image. FIG. 14c is an example of the morphological kernel, in this case a rectangle, used in morphological operations. FIG. 14d is an example of a morphological image resulting from the application of the morphological kernel (as shown in FIG. 14c) to the edge detection image. Relative to FIG. 14b, the effect of applying the morphological operation to the edge image is to dilate each edge fragment in the horizontal direction. Areas representing building structures will be totally filled because the corresponding image areas have many edge fragments, while the image area corresponding to the road remains intact after this operation because this area lacks edge fragments. The road image includes non-filled areas of FIG. 14b. FIG. 14e is an example of the detected road superimposed on the grayscale image. In contrast to FIG. 14d, the detected road is a trace of the edge of the morphological image as enhanced through smoothing.

Turning again to FIG. 6, the verification module 340 determines 650 whether the candidate is actually human. For verified pedestrians, the pedestrian detection module 220 notifies the output display module 210 to displays 1050 a pedestrian object in the detection frame. Otherwise, the output display module 210 displays 1060 no object.

In one embodiment, the verification module 340 further includes a support vector machine 345 to verify candidates. Accordingly, the support vector machine 345 classifies 1020 candidates by calculating the boundary, or support vectors, between two sets of high dimensional vectors. The support vector machine may use one or many classifiers. The training database 165 may organize image clips in a data structure for efficient searches by classifiers. Classifiers in the training database 265 are determined from categories of pedestrian types such as side profile, front profile, bicyclist, or otherwise. The support vector machine 345 compares 1030 the boundary to those in the training database 165 by performing pattern matching against training data having commonly defined classifiers to determine whether the candidate matches an image clip 1040.

For a case of two-class pattern recognition in the support vector machine 345, the task of predictive learning from examples can be formulated as (2) and (3). Given a set of functions $f_\alpha$:

$$\{f_\alpha : \alpha \in \Lambda\}, f_\alpha : R^N \to \{-1, +1\} \quad (2)$$

where $\Lambda$ is an index set and a set of l examples:

$$(x_1, y_1), \ldots, (x_i, y_i), \ldots, (x_l, y_l), x_i \in R^N, y_i \in \{-1, +1\} \quad (3)$$

where $x_i$ is a feature vector of N dimensions and, $y_i$ represents the class, which has only two values −1 and +1, each one generated from an unknown probability distribution P(x,y), we want to find a particular function $f^*_\alpha$ which provides the smallest possible value for the risk, as defined in (4).

$$R(\alpha) = \int |f_\alpha(x) - y| dP(x,y) \quad (4)$$

The support vector machine 345 separates hyper-planes $D(X) = (w\ X + w_0)$ by mapping the input data X into a higher dimensional space Z using a nonlinear function g. The data points at the maximum margin in pedestrian training data are called the support vectors because they define an optimal hyperplane. The optical hyperplane is also achieved by varying the kernel type, sigma, or number of support vectors. The kernel type may be, for example, linear, polynomial, or Gaussian. The support vector machine is described in further detail in U.S. patent application Ser. No. 10/396,1085, entitled "Real-Time Eye Detection and Tracking Under Various Light Conditions," and V. Vapnik, "The Nature of Statistical Learning Theory," Springer, 2000, which are incorporated by reference herein in its entirety.

Figure 15A:
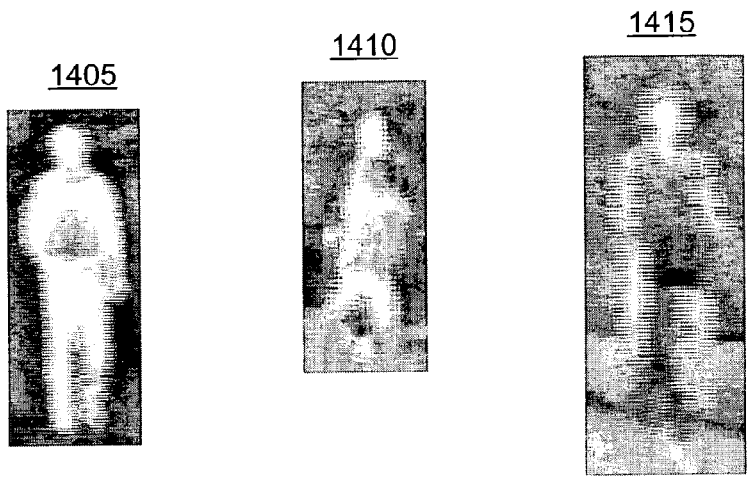
FIGS. 15a–c are images illustrating candidate verification according to one embodiment of the present invention.
Figure 15B:
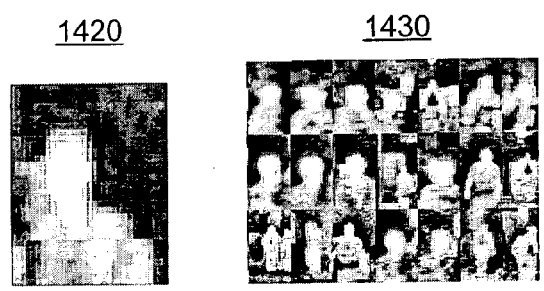
Figure 15C:
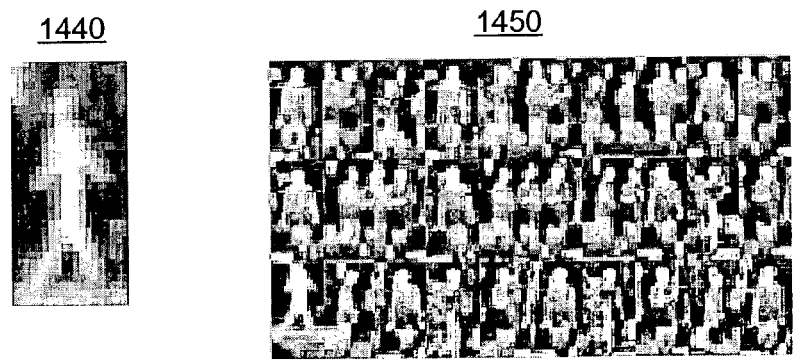

FIGS. 15a–c are images illustrating candidate verification according to one embodiment of the present invention. FIG. 15a is an example of classifiers used in the training database 165 according to one embodiment of the present invention. The classifiers are pedestrian types including a front profile 1405, a side profile 1410, and a bicyclist 1415. FIG. 15b is an example of a classified body-center candidate of a head 1420 and corresponding image clips 1430 from the training database 165 for comparison. FIG. 15c is an example of a classified body-center candidate of an entire body 1440 and corresponding image clips 1450 for comparison.

Figure 10:
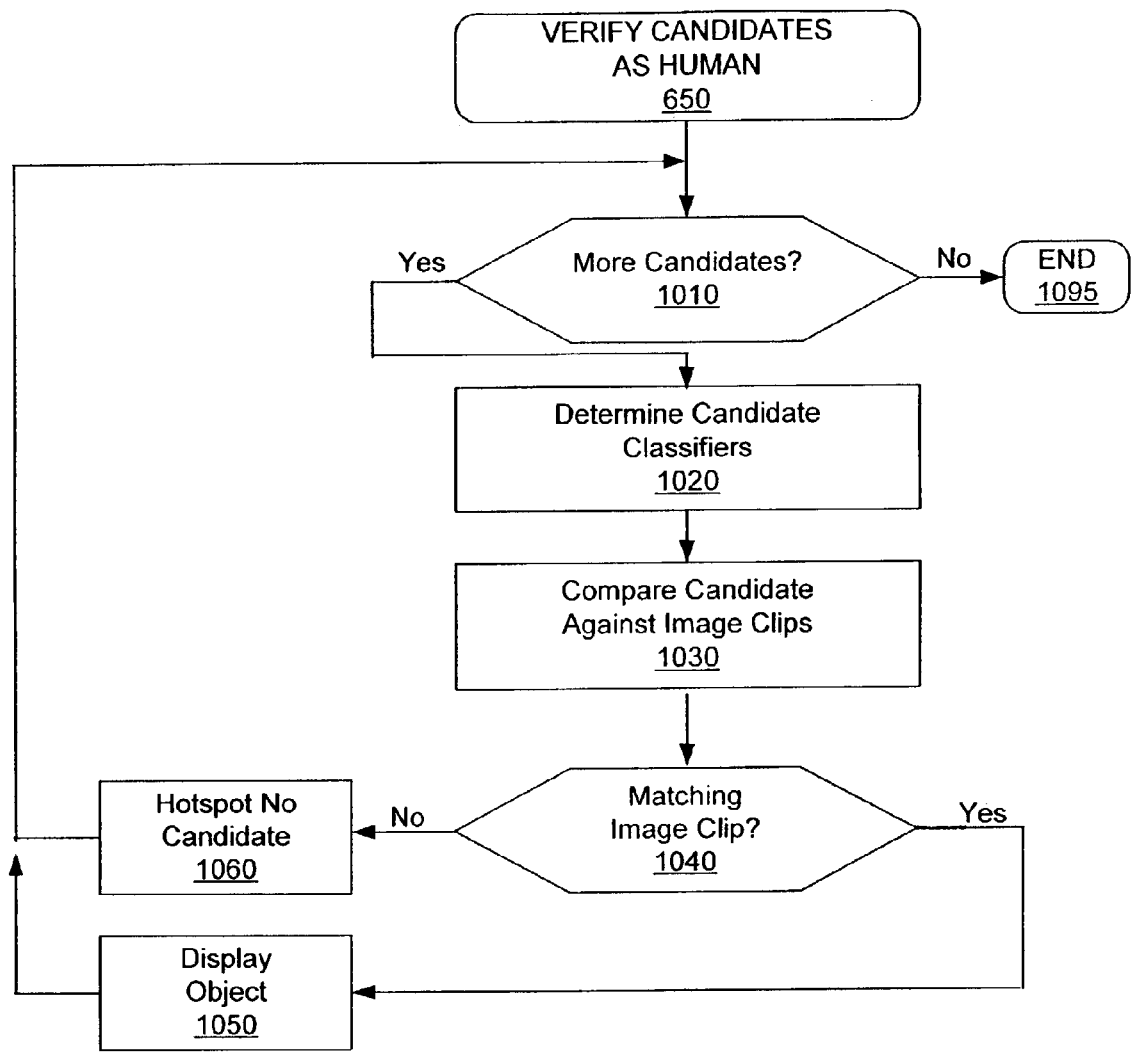
FIG. 10 is a flow chart illustrating the method of verifying candidates according to one embodiment of the present invention.

FIG. 10 is a flow chart illustrating a method of tracking pedestrians according to one embodiment of the present invention. The output display module 210 determines 1010 whether a detection frame or a tracking frame is interleaved into the output video. If the output display module 210 indicates that a tracking frame should be interleaved, then the pedestrian movement prediction module 410 estimates 1020 pedestrian movement relative to the detection frame.

In one embodiment, the output display module 240 periodically interleaves detection frames and tracking frames in generating output video. Accordingly, the output display module 240 first outputs a detection frame followed by a number of tracking frames. The output display module 240 may periodically request additional detection frames in response to the tracking frames reaching a predetermined count, passing an error threshold, falling below a reliability threshold, or otherwise. The output display module 240 composes and renders video output frames for the display 120 by overlaying an appropriate pedestrian object onto a captured image frame such a shape or inverted video.

The current position can be the detection frame or the previous prediction frame. In one embodiment, the object movement prediction module 410 applies Kalman filtering to estimate the new position. For time updating, Kalman filtering uses equation (7) for priori positions, and equation (8) for priori measurements. For measurement updating, Kalman filtering uses equation (9) for Kalman gain, equation (10) for posteriori positions, and equation (11) for posteriori measurements.

$$S_k^- = \Phi S_{k-1} \tag{7}$$

$$P_k^- = \Phi P_{k-1} \Phi^T + Q \tag{8}$$

$$K_k = P_k^- H_k (H_k P_k^- H_k^T + R_k)^{-1} \tag{9}$$

$$S_k = S_k^- K_k (Z_k - H_k^T S_k^-) \tag{10}$$

$$P_k = (I - K_k H_k) P_k^- \tag{11}$$

Where $S_{k-1}$, $S_k$, and $S_k^-$ are estimated positions at time k−1, estimated positions at time k, and estimated position at time k before updating with the error between $S_k$ and $Z_k$, respectively. $P_{k-1}$, $P_k$, and $P_k^-$ are error covariance for current parameters at time k−1, current parameters at tie k, and estimated parameters at time k; $\Phi$ is the transformation matrix from $S_{k-1}$ to $S_k^-$; Q represents the model error; $Z_k$ is the measurement at time k; $H_k$ is the noiseless connection between the measurement $Z_k$ and position $S_k$ at time k, $K_k$ is the Kalman gain or blending factor that minimizes the $P_k$. Time related parameters are updated each frame. Kalman filtering prediction is further described in K. Rohr, "Incremental Recognition of Pedestrians from Image Sequences," Proc. Computer Vision and Pattern Recognition (1993), pp. 8–13, and S. Haykin, "Adaptive Filter Theory," 3d edition (1996), pp. 302–334, which are incorporated by reference herein in their entirety.

The prediction adjustment module 420 adjusts 1030 the pedestrian prediction module estimate. The output display module 210 outputs 1040 the tracking frame. If the output display module 210 indicates that a detection frame should be interleaved, the pedestrian detection module 210 generates 510 a detection frame.

In one embodiment, the prediction adjustment module 420 applies mean-shifting to precisely estimate pedestrian location to factor in nonlinear human movement. Mean-shifting uses equation (12) to find the precise position around the posteriori position.

$$m(x) = \frac{\sum_{s \in S} K(s-x) w(s) s}{\sum_{s \in S} K(s-x) w(s)} \tag{12}$$

where x is the current position, w(s) is a weight function (the ratio of histogram value between original grayscale level and the current grayscale level at location s), and m(x) is the new position, K is the kernel, as determined by equation (13).

$$K(x) = \frac{1}{4\Pi} e^{\frac{\|x\|}{2}} \tag{13}$$

Mean-shifting is further described in Y. Cheng, "Mean Shift, Mode Seeking, and Clustering," IEEE Transactions on Pattern Analysis and Machine Intelligence, 17(8): 790–799 (1995), which is incorporated by reference herein in its entirety. Additional embodiments of the prediction adjustment module 420 and methods operating therein are discussed below.

Figure 16:
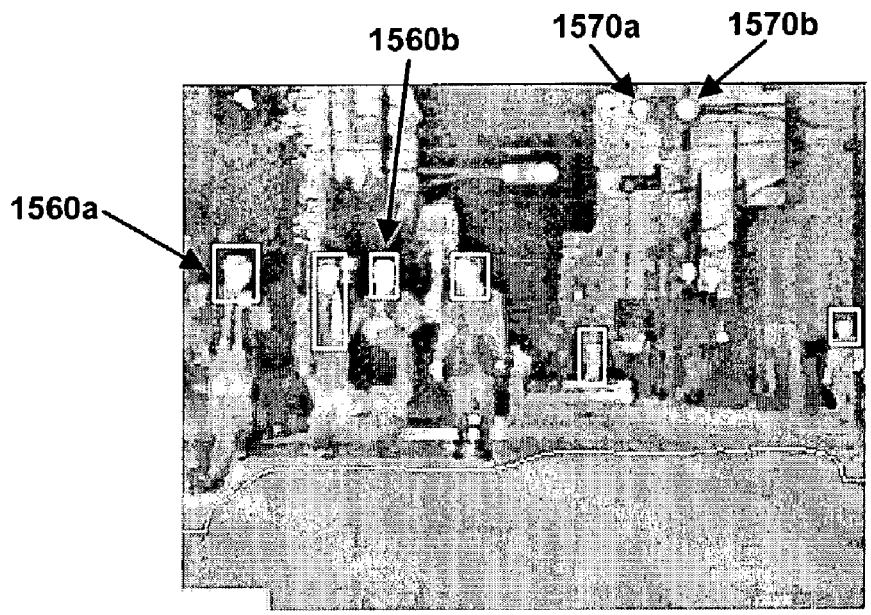
FIG. 16 is an example of a pedestrian tracking image according to one embodiment of the present invention.

FIG. 16 is an example of a pedestrian tracking image according to one embodiment of the present invention. The pedestrian tracking image 1500 includes several detected pedestrians 1560 corresponding to hotspots 1610 in the hotspot image 1600. In contrast to FIG. 17, many hotspots (e.g. 1620) have been eliminated (e.g. 1570) by the candidate detection module and the verification module In summary, the system 100 leverages off of images captured by the night vision camera 110 to detect and track pedestrians at night. The pedestrian detection module 220 utilizes a single camera on a moving vehicle by processing the captured image for pattern recognition with the support vector machine. Furthermore, the pedestrian tacking module 230 reduces computations by using Kalman filtering and mean-shifting to precisely estimate movement of the pedestrian without the need for processor intensive pedestrian detection.

The above description is included to illustrate the operation of the preferred embodiments and is not meant to limit the scope of the invention. The scope of the invention is to be limited only by the following claims. From the above discussion, many variations will be apparent to one of ordinary skill in the art that would yet be encompassed by the spirit and scope of the invention.

We claim:

1. A method of identifying one or more humans in a sequence of infrared images from a single perspective, comprising the steps of:
   receiving a first image of the sequence of infrared images, said first image including a human image; and
   detecting the human image by detecting candidate sections of the first image based on a classifier related to hotspots in said first image and matching the detected candidate sections with a classifier related to a plurality of base images.

2. The method of claim 1, wherein the classifier related to a plurality of base images is based on a side profile, a front profile, and a seated profile.

3. The method of claim 1, wherein the classifier related to hotspots is based on a human characteristic, wherein said human characteristic is one of a head, a hand, and a foot.

4. The method of claim 1, wherein the step of detecting the human image further comprises the step of categorizing a hotspot as one of a body-center type and a portion of a body-ground type to identify a candidate section of the first image.

5. The method of claim 4, wherein the body-center type comprises a single hotspot within human parameters and the body-ground type comprises a plurality of hotspots within human parameters.

6. The method of claim 1, wherein the step of detecting the human image further comprises the steps of:
   detecting a road image in said first image; and
   estimating the size of a candidate based on a distance between a hotspot and the road image.

7. The method of claim 6, wherein the step of detecting the road further comprises:
   finding areas of substantially constant gradient; and
   performing a morphological operation.

8. The method of claim 1, further comprising the steps of:
   predicting a position of the human in a second image relative to a detected position in the first image using a linear filtering operation; and
   tracking the human image in the second image of the sequence of infrared images based upon said predicted position.

9. The method of claim 8, wherein the step of predicting the position of the human further comprises the step of adjusting the predicted position using a mean-shifting operation.

10. The method of claim 8, further comprising the steps of:
    overlaying an object correlating to the detected position of the human in the first image and the predicted position in the second image; and
    outputting the first and second images.

11. The method of claim 10, wherein outputting further comprises the steps of:
    generating a detection frame based on the step of detecting the human image;
    generating a tracking frame based on the step of tracking the human image; and
    repeating said step of generating the tracking frame.

12. The method of claim 11, wherein the step of repeating said step of generating further comprises generating the tracking frame unless a count of tracking frames is above a predetermined threshold.

13. An apparatus for identifying one or more humans in a sequence of infrared images from a single perspective, comprising:
    a buffer for receiving the sequence of infrared images from the single perspective; and
    a human detection module for detecting a human image in a first image of the sequence of images by detecting candidate sections of the first image based on a classifier related to hotpots in said first image and matching the detected candidate sections with a classifier related to a training database having a plurality of base images.

14. The apparatus of claim 13, wherein the human detection module comprises:
    a candidate detection module for identifying a candidate from the one or more hotpots as one of a body-center type and a portion of a body ground type; and
    a verification module for comparing candidates against the plurality of base images.

15. The apparatus of claim 14, wherein the verification module further comprises a support vector machine for identifying the classifier related to the first image from the candidate identified by the candidate detection module, and matching the hotspot classifier to the classifier from the plurality of base images.

16. The apparatus of claim 14, wherein the plurality of base images comprise positive human image clips having human images and negative human image clips having non-human images.

17. The apparatus of claim 14, wherein a candidate comprises an image clip extracted from the first image corresponding to the hotspots.

18. The apparatus of claim 13, wherein the human detection module further comprises a hotspot identification module for identifying the hotspots as a one or more clusters of pixels in the first image having pixels with an intensity above an intensity threshold.

19. The apparatus of claim 18, wherein the hotspot identification module further comprises a noise compressor for eliminating hotspots outside of human parameters.

20. The apparatus of claim 14, wherein the candidate detection module further comprises a road detection module for identifying a road image in the first image.

21. The apparatus of claim 20, wherein the road detection module applies an edge detector to the first image to identify one or more areas of substantially constant intensity, and applies a morphological operator to identify the road image based on a morphological kernel.

22. The apparatus of claim 21, wherein the morphological kernel is variable based on road conditions.

23. The apparatus of claim 13, wherein the human tracking module further comprises a prediction module for applying a Kalman filter to the first image to predict the position of the human in the second image.

24. The apparatus of claim 23, wherein the human tracking module further comprises an adjustment module for applying a mean-shifting operation to adjust the predicted human position.

25. The apparatus of claim 13, wherein the one or more hotspots is based on one of a head, a hand, and a foot.

26. The apparatus of claim 13, wherein the one or more hotspots is based on one of a side profile, a front profile, and a seated profile.

27. The apparatus of claim 13, further comprising an infrared video source for outputting the sequence of infrared images from the single perspective to the buffer.

28. The apparatus of claim 13, wherein the sequence of images comprises a moving background.

29. The apparatus of claim 13, further comprising an output display module for generating a detection frame from the detected human image, and generating a tracking frame from the estimated human movement.

30. The apparatus of claim 29, wherein the output display module continues to generate tracking frames, and generates the detection frame responsive to generating a predetermined number of subsequent tracking frames.

31. The apparatus of claim 29, further comprising a processor, wherein the output display module continues to generate detection frames, and generates the tracking frame responsive to a processing load of the processor being above a predetermined threshold.

32. A computer product, comprising:
    a computer-readable medium having computer program instructions and data embodied thereon for identifying one or more humans in a sequence of infrared images from a single perspective, comprising the steps of:
    receiving a first image of the sequence of images, said first image including a human image; and detecting the human image by detecting candidate sections of the first image based on a classifier related to hotspots in said first image and matching the detected candidate sections with a classifier related to a plurality of base images.

33. The computer program product of claim 32, wherein the classifier is based one of a side profile, a front profile, and a seated profile.

34. The computer program product of claim 32, wherein the classifier is based on a human characteristic, wherein said human characteristic is one of a head, a hand, and a foot.

35. The computer program product of claim 32, wherein the step of detecting the human image further comprises the step of categorizing a hotspot as one of a body-center type and a portion of a body-ground type to identify a candidate.

36. The computer program product of claim 35, wherein the body-center type comprises a single hotspot within human parameters and the body-ground type comprises a plurality of hotspots within human parameters.

37. The computer program product of claim 32, wherein the step of detecting the human image further comprises the steps of:
 detecting a road image in said first image; and
 estimating the size of a candidate based on the distance between a hotspot and the road image.

38. The computer program product of claim 37, wherein the step of detecting the road further comprises:
 finding areas of substantially constant gradient; and
 performing a morphological operation.

39. The computer program product of claim 32, further comprising the steps of:
 predicting a position of the human in the second image relative to a detected position in the first image using a linear filtering operation; and
 tracking the human image in a second image of the sequence of infrared images based upon said predicted position.

40. The computer program product of claim 39, wherein the step of predicting the position of the human further comprises the step of adjusting the predicted position using a mean-shifting operation.

41. The computer program product of claim 39, further comprising the steps of:
 overlaying an object correlating to the detected position of the human in the first image and the predicted position in the second image; and
 outputting the first and second images.

42. The computer program product of claim 41, wherein outputting further comprises the steps of:
 generating a detection frame based on the step of detecting the human image;
 generating a tracking frame based on the step of tracking the human image; and
 repeating said step of generating the tracking frame.

* * * * *